United States Patent
Backlund

(10) Patent No.: US 7,895,343 B2
(45) Date of Patent: Feb. 22, 2011

(54) METHOD AND APPARATUS RELATING TO RETRANSMISSION OF DATA BETWEEN DIFFERENT PROTOCOL LAYERS

(75) Inventor: Ingemar Backlund, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1701 days.

(21) Appl. No.: 10/500,308

(22) PCT Filed: Dec. 20, 2002

(86) PCT No.: PCT/SE02/02422

§ 371 (c)(1),
(2), (4) Date: Mar. 11, 2005

(87) PCT Pub. No.: WO03/056744

PCT Pub. Date: Jul. 10, 2003

(65) Prior Publication Data

US 2006/0059186 A1   Mar. 16, 2006

(30) Foreign Application Priority Data

Dec. 27, 2001 (SE) .................................. 0104422
Feb. 4, 2002 (SE) .................................. 0200308

(51) Int. Cl.
G06F 15/16 (2006.01)
G06F 7/00 (2006.01)
H04J 3/16 (2006.01)
G01R 31/08 (2006.01)

(52) U.S. Cl. ........................ 709/230; 707/102; 370/469; 370/231

(58) Field of Classification Search ................. 709/230; 707/102; 370/469, 231
See application file for complete search history.

(56) References Cited

U.S. PATENT DOCUMENTS

| 6,097,731 A | 8/2000 | Aoki |
| 6,115,393 A | 9/2000 | Eagel et al. |
| 6,728,208 B1 * | 4/2004 | Puuskari .................. 370/230.1 |

(Continued)

FOREIGN PATENT DOCUMENTS

EP    1 107 626 A2    6/2001

(Continued)

OTHER PUBLICATIONS

EP Communication mailed Jul. 24, 2008 in corresponding EP application 02793722.6.

Primary Examiner — Tonia L Dollinger
Assistant Examiner — Mark D Fearer
(74) Attorney, Agent, or Firm — Nixon & Vanderhye, P.C.

(57) ABSTRACT

The present invention relates to a method and apparatus for improving the procedures for error detection and recovery in data communication systems and thereby facilitating a better use of data transmission resources. According to the invention, different protocols capable of re-transmission of data are made to communicate with each other in order to avoid that several protocols simultaneously re-transmit the same data towards the same interface. The transmitting entity of a higher layer protocol will, according to the invention, await the result of the transmission of a certain protocol data unit by a lower layer protocol before making the decision of whether or not the transmitting entity of the higher layer protocol should re-transmit the certain protocol data unit.

20 Claims, 8 Drawing Sheets

U.S. PATENT DOCUMENTS 7,127,518 B2 * 10/2006 Vange et al. ................ 709/230
2003/0018793 A1 * 1/2003 Mora ......................... 709/230

FOREIGN PATENT DOCUMENTS

| WO | 00/24152 A1 | 4/2000 |
| WO | 01/37493 A1 | 5/2001 |
| WO | 01/60023 A1 | 8/2001 |
| WO | 02/069547 A1 | 9/2002 |

* cited by examiner

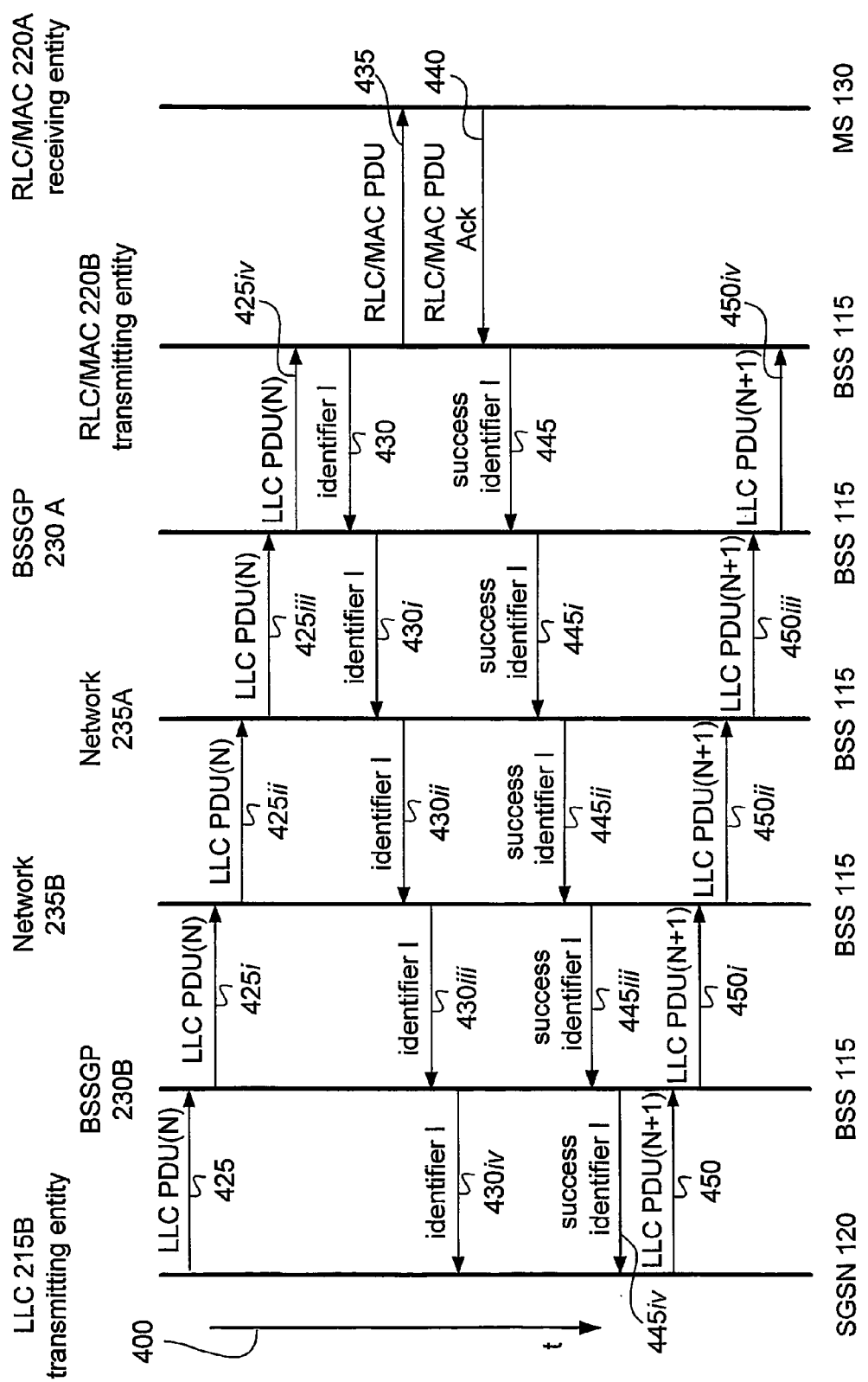

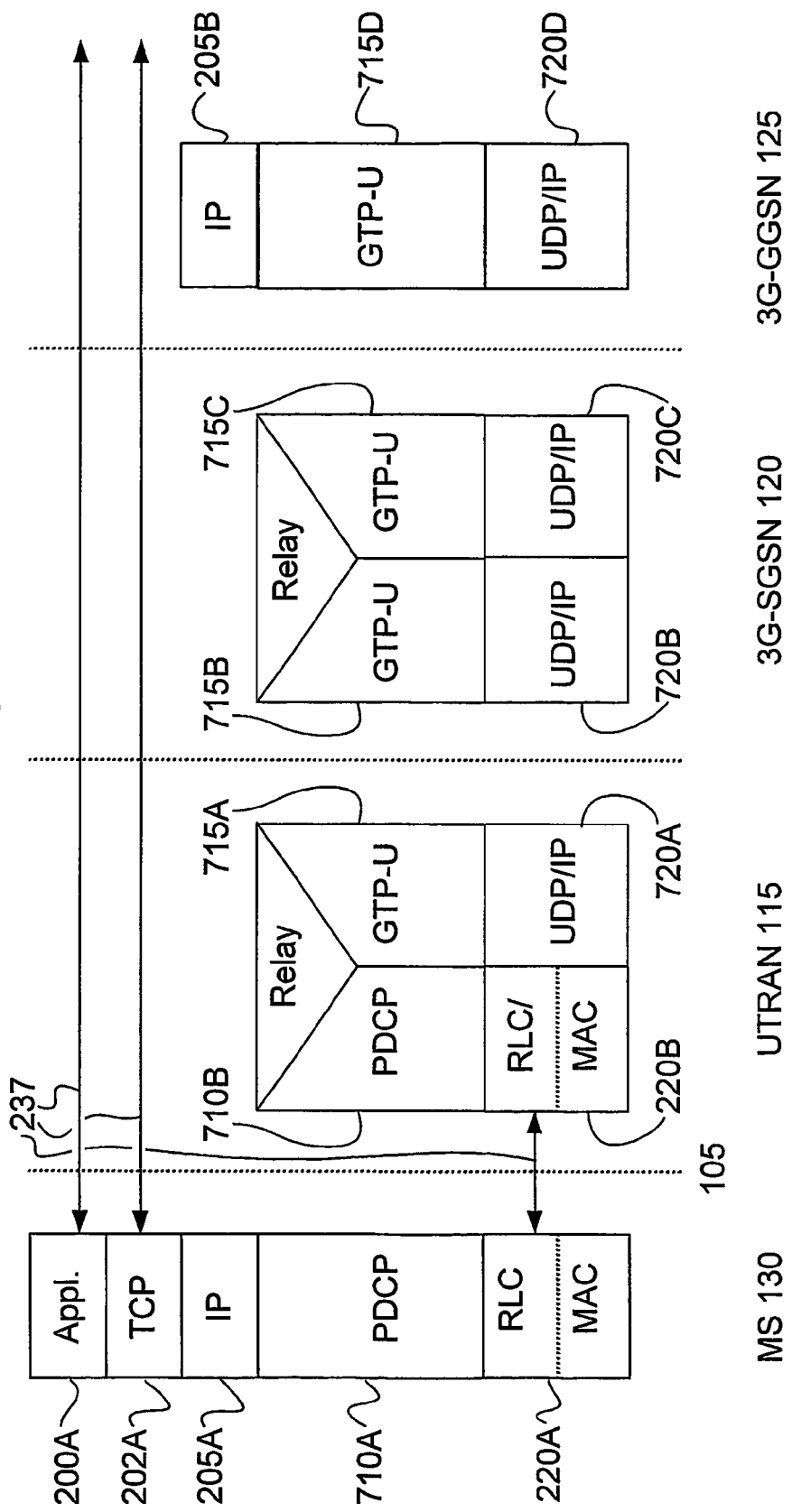

METHOD AND APPARATUS RELATING TO RETRANSMISSION OF DATA BETWEEN DIFFERENT PROTOCOL LAYERS

This application is the US national phase of international application PCT/SE02/02422 filed in English on 20 Dec. 2002, which designated the US. PCT/SE02/02422 claims priority to SE Application No. 0104422-1 filed 27 Dec. 2001 and SE 0200308-5 filed 4 Feb. 2002. The entire contents of these applications are incorporated herein by reference.

FIELD OF THE TECHNOLOGY

The present technology relates to data transmission in general, and more particularly to a method and apparatus for improving the procedures for error detection and recovery in data communication systems.

BACKGROUND

Most data communication systems consist of a number of nodes, between which data is transmitted by use of several protocols. The protocols used within a node is often referred to as a protocol stack, the lower layer protocols in the protocol stack being closer to the physical interface used for the transmission of data to/from the node, while higher layer protocols are close to the application used by a user of the data communication system. The protocols used within different nodes need by no means be the same. Each protocol in a protocol stack has a corresponding protocol in another protocol stack in at least one other node, with which the protocol in the stack communicates. The highest layer protocol used within the system is often referred to as the application layer protocol. The lower layer protocols used within the data transmission system enable the application layer protocol in one node to communicate with the application layer protocol in other nodes.

For some transmission types, such as the transmission of speech, it is more important that data arrives on time than that the received data is an exact copy of what was originally transmitted. For other transmission types, such as the downloading of information from the Internet, it is important that the received data is identical to the data originally transmitted, and this criterion is given higher priority than that the data arrives at the receiver within a certain period of time. In many data communication systems, a possibility of re-transmitting data, which for some reason was not correctly received, is therefore included. Such functionality for re-transmission of data can be implemented at several protocols used within a protocol stack.

SUMMARY

A problem to which one aspect of the present technology relates is how to make the communication of data in a data communication system more efficient.

This problem is addressed by a method in a data communication system wherein data is transmitted by use of at least two protocols that are capable of re-transmission of data. Each of said protocols are implemented in at least two nodes of said data communication system, the implementation of a protocol implemented in a transmitting node being a transmitting protocol entity and the implementation of a protocol in a receiving protocol being a receiving protocol entity. One of said at least two protocols capable of re-transmission of data is a higher layer protocol than another of said at least two protocols, said another protocol therefore being a lower layer protocol. The higher layer transmitting protocol entity provides the lower layer transmitting protocol entity with a protocol data unit to be transmitted. The method is characterised by the higher layer transmitting protocol entity awaiting a transmission result from said lower layer transmitting protocol entity, said transmission result reporting the result of the transmission of said protocol data unit by said lower layer transmitting protocol entity, the higher layer transmitting protocol entity receiving said transmission result, and deciding, responsive to said transmission result, whether the higher layer transmission protocol entity should re-provide said lower layer transmitting entity with said protocol data unit for transmission.

The problem is further addressed by a computer program comprising software code portions for, when said software code portion is run on a computer serving as a transmitting node in a data communications system, providing another computer program with a protocol data unit to be transmitted within said data communication system. The computer program further comprises software code portions for re-providing said another computer program with the protocol data unit. The computer program is characterised by computer code portions for awaiting, from said another computer program, a transmission result reporting the transmission of said protocol data unit and computer program portions for receiving said transmission result from said another computer program. In one aspect of the technology, said computer program further comprises computer code portions for deciding whether or not to re-provide said protocol data unit to said another computer program, the computer code portions for deciding being adapted to use said transmission result in deciding whether or not to re-provide said protocol data unit By said method and computer program is achieved that the risk is eliminated that the same user data is successfully transmitted between nodes more than once. Hence, the transmission resources will be used in a more efficient way, resulting in that more data transmission session can be served, and that the transmission times for each data transmission session will be shortened. The risk of a protocol, such that the Transmission Control Protocol (TCP), decides that a data session is not functioning properly and should be closed due to long transmission times is reduced.

The problem is further addressed by a method in which the lower layer transmitting protocol entity sends a transmission result to the higher layer transmitting protocol entity, said transmission result reporting the result of transmission of the protocol data unit by the lower layer transmitting protocol entity. Hereby is achieved that the higher layer transmitting protocol entity receives information based upon which the decision of whether or not the protocol data unit should be re-provided is taken.

In one aspect of the technology, said protocol data unit is identified in the communication between the higher layer transmitting protocol entity and the lower layer transmitting protocol entity, by use of an identifier. Hereby is achieved that several protocol data units can be transmitted directly following each other. Said identifier could e.g. be an identifier local to the communication between the higher layer transmitting protocol entity and the lower layer transmitting protocol entity. By using a local identifier is achieved that the identifier can take large values. Furthermore, the lower layer transmitting protocol entity will not need to open the protocol data unit provided by the higher layer transmitting protocol entity. In one embodiment, said identifier is assigned to said protocol data unit by said higher transmitting protocol entity. Hereby is achieved that the communication of said identifier can be performed in the message in which the protocol data unit is provided to the lower layer transmitting protocol entity. In another embodiment, said identifier is assigned to said protocol data unit by the lower layer transmitting protocol entity.

In one embodiment of the technology, said higher layer transmitting protocol entity receives an acknowledgement of reception of said protocol data unit from said lower layer transmitting protocol entity after having provided said lower layer transmitting protocol entity by said protocol data unit, said protocol data unit being identified by said identifier in said acknowledgement of reception.

In one aspect of the technology, said transmission result is transmitted to said higher layer transmitting protocol entity from said lower layer transmitting protocol entity in a message which is transparently relayed by some or all of any intermediate protocol entities.

The technology is advantageously applicable to data communication systems comprising a radio interface. One aspect of the technology is applicable to data communication systems wherein said radio interface is a radio interface in a mobile radio communication system. In situations where said mobile radio communication system is a mobile radio communication system operating according to the General Packet Radio System standard, said higher layer transmitting protocol entity could be a Logical Link Control protocol and said lower layer transmitting protocol entity could be a Radio Link Control/Media Access Control protocol.

BRIEF DESCRIPTION OF THE DRAWINGS

FIG. 4b is an example of an inventive signalling diagram used for signalling between a higher layer protocol and a lower layer protocol, both protocols being capable of re-transmission of data, when the two protocols are implemented in different nodes.

FIG. 7 is an example of protocol stacks used for communication of data within a data communication system including a mobile radio network operating according to the Universal Mobile Telephony System (UMTS) standard.

DETAILED DESCRIPTION

Figure 1:
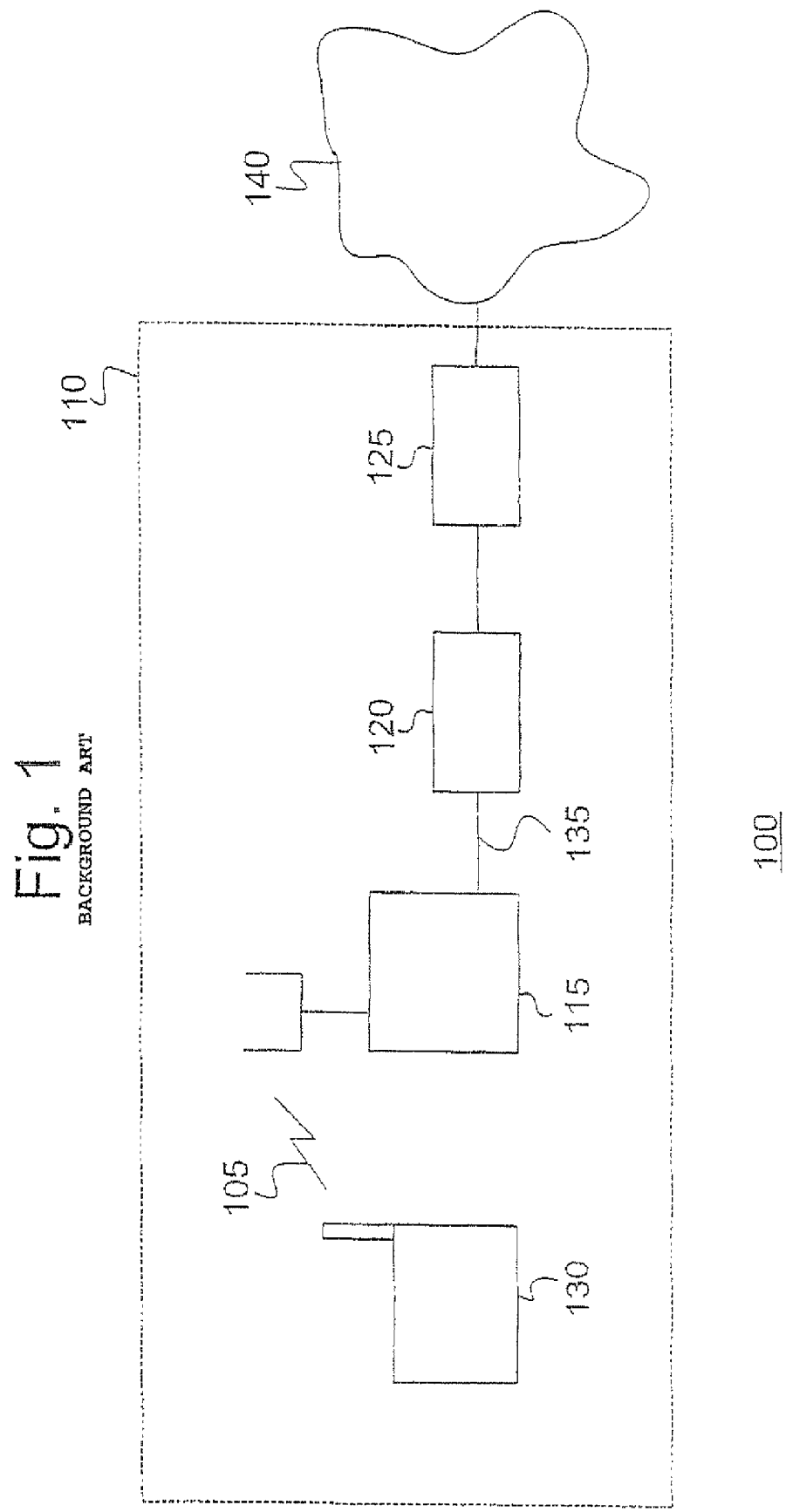
FIG. 1 is an overview of a data communication system.

A data communication system 100 including radio interface 105 is illustrated in FIG. 1. The data communication system 100 will hereinafter be referred to as the system 100. The system 100 shown in FIG. 1 is, for the purposes of illustration, shown to include a mobile radio network 110 operating according to the General Packet Radio Services (GPRS) standard. However, the technology is advantageously applicable also to systems 100 including other radio interfaces, such as radio interfaces operating according to the Universal Mobile Telephony System (UMTS) standard or the Wireless Local Area Network (W-LAN) standard, or to any other system 100 in which several protocols are individually capable of re-transmission of data.

The mobile radio network 110 comprises a Base Station Subsystem (BSS) 115, a Serving GPRS Support Node (SGSN) 120, and a Gateway GPRS Support node (GGSN) 125. A Mobile Station (MS) 130 can communicate within the system 100 via the radio interface 105. On the other side of the radio interface 105, the BSS 115 is connected to the SGSN 120 via an interface 135 referred to as the Gb-interface 135. The SGSN 120 is further connected to the GGSN 125, which in turn is connected to other networks 140 such as the Internet, Public Switched Telephony Networks (PSTNs), Integrated Services Digital Networks (ISDNs) or other mobile radio networks.

Figure 2:
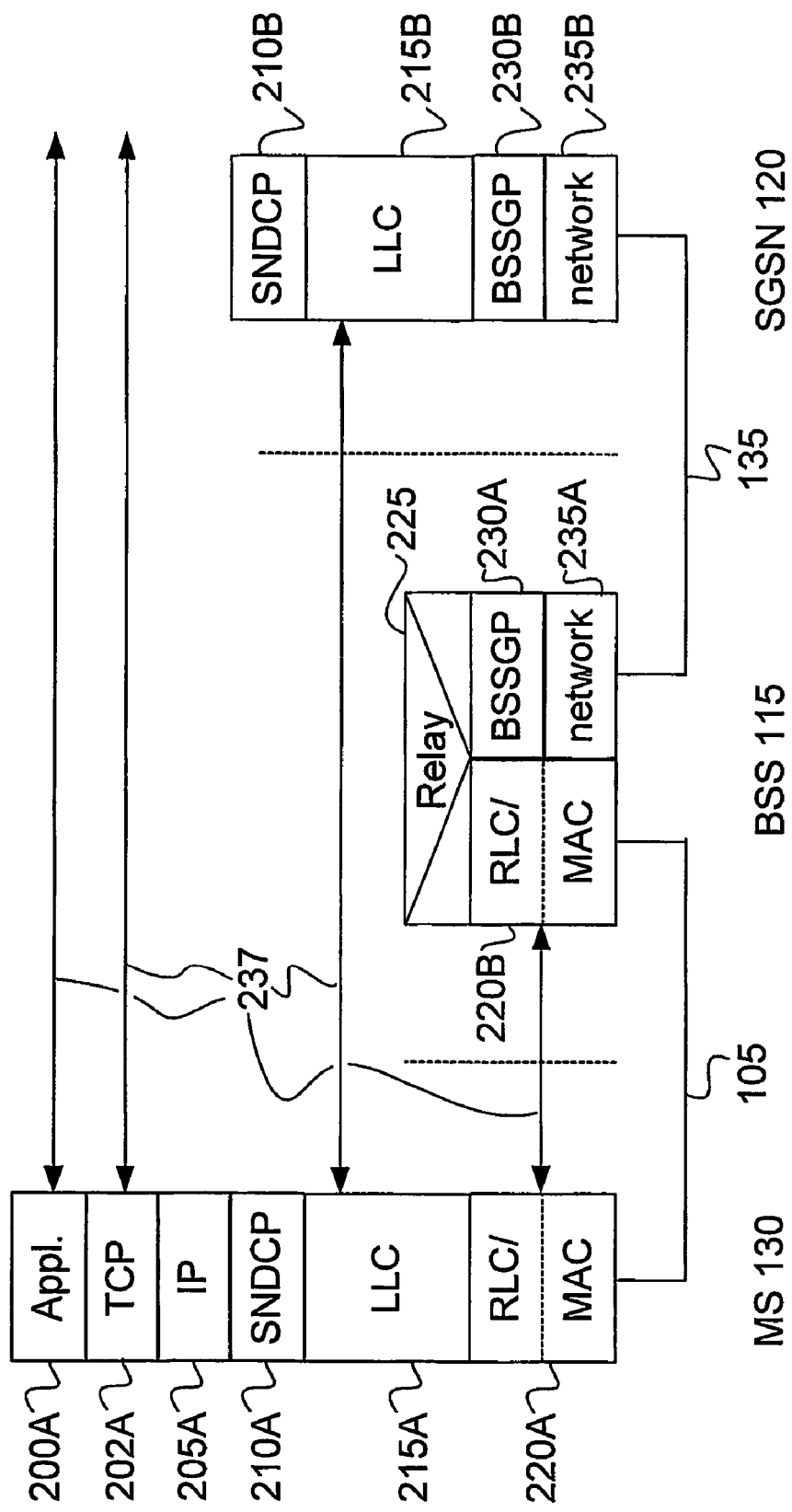
FIG. 2 is an example of protocol stacks used for communication of data within a data communication system including a mobile radio network operating according to the GPRS standard.

In FIG. 2, an example of protocol stacks that can be used for the transmission of data in system 100 of FIG. 1 are illustrated. For illustrative purposes, the protocol stacks shown are not complete, but some protocols, such as higher layer protocols in the SGSN 120 protocol stack and the physical layer protocols, are left out. Hereinafter, when referring to a certain protocol in general, a reference numeral such as e.g. reference numeral 200 will be used, while the same reference numeral, with a letter appended, will be used for referring to the protocol when implemented on a specific node. Hence, protocol 200A, 200B, 200C etc, will all be implementations of the protocol 200, on different nodes. By a protocol which is implemented on a node should be understood a computer program, executable on a processor on said node, in accordance with the functionality of the protocol. However, in order to simplify the description, the term protocol is used both to denote the set of instructions for transmission known as a protocol, and to denote the executable computer program implemented on a node for the execution of said instructions. In the following, a protocol in a protocol stack of a transmitting node will be referred to as the transmitting entity of the protocol, while the corresponding protocol to which the protocol in the transmitting node transmits data will be referred to as the receiving entity of the protocol. Obviously, in two way communication, a protocol in a certain protocol stack will alternately be the receiving entity of the protocol and the transmitting entity of the protocol.

The example of a protocol stack for use in the MS 130 shown in FIG. 2 comprises the following protocols: An application layer 200A, Transmission Control Protocol (TCP) 202A, Internet Protocol (IP) 205A, SubNetwork Dependent Convergence Protocol (SNDCP) 210A, Logical Link Control (LLC) 215A, Radio Link Control/Media Access Control (RLC/MAC) 220A. The protocol stack used in BSS 115 for communication via radio interface 105 comprises the RLC/MAC 220B, which is a protocol corresponding to RLC/MAC 220A, and a relay layer 225, while the protocol stack of BSS 115 used for transmission via the Gb-interface 135 comprises the protocols Base Station System GPRS control (BSSGP) 230A and network 235A (network 235 is used in the figure to represent the use of either Frame Relay or TCP/IP, as specified in $3^{rd}$ *Generation Partnership Project* (*3GPP*) *Technical Specification* (*TS*) 48.016, *3rd Generation Partnership Project*). In SGSN 120, the following protocols are shown (starting with the lower layers protocols): network 235B, BSSGP 230B, LLC 215B and SNDCP 210B. The corresponding protocols of TCP 202A and IP 205A, i.e. TCP 200B and IP 205B, are implemented in further nodes, not shown in FIG. 2. When MS 130 is sending data, the RLC/MAC 220A is the transmitting entity of the RLC/MAC protocol 220 while RLC/MAC 220B is the receiving entity of the RLC/MAC protocol 220, and vice versa. When RLC/MAC 220A is the transmitting entity of the RLC/MAC protocol 220, then the LLC 215A is the transmitting entity of the LLC protocol 215, and so forth.

Figure 3:
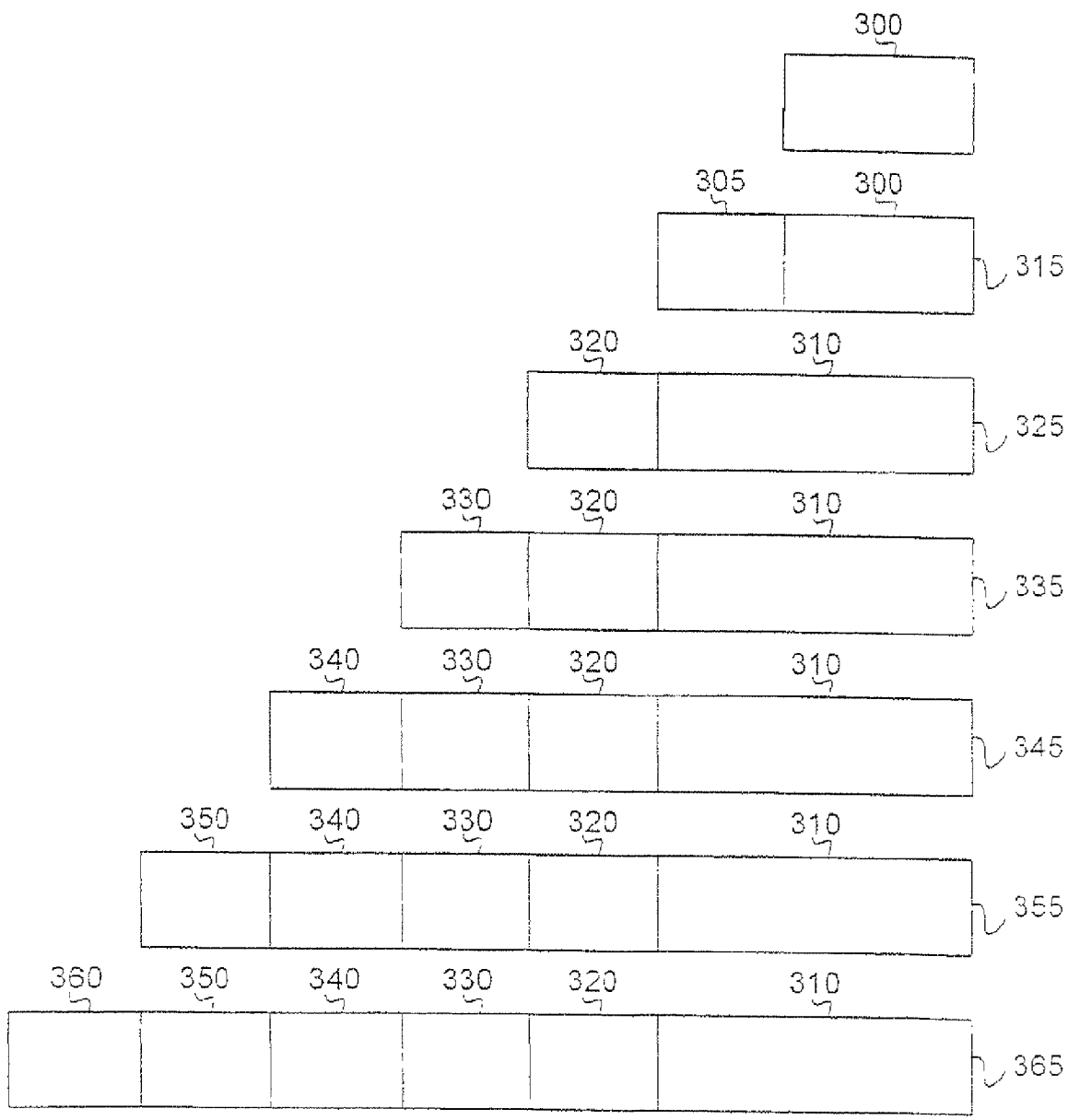
FIG. 3 gives a schematic example of how user data is encapsulated by protocols used for transmission in the data communication system.

With reference to FIG. 2, a schematic example 130 is shown in FIG. 3 of how user data 300, to be transmitted by MS 130, is encapsulated by the protocols used for transmission in system 100, the protocols in the protocol stack of MS 130 being used in the example for purposes of illustration. Note, however, that the protocols used for encapsulation of user data 300 need not be located within the same node, but can be located in different nodes involved in the transmission. Each protocol of the protocol stack adds information to the data by adding a header, and possibly a trailer, to the data received from the protocol layer above, as is shown in FIG. 3. In FIG. 3, in order to simplify the description, only the addition by each protocol of a header layer is shown, and no addition of a trailer. In the application layer 200, an application layer header 305 is added to the user data 300, to form the application data 310, which makes up an application layer Protocol Data Unit (PDU) 315. In TCP 202A, a TCP header 320 is added to the application layer PDU 315, in order to make up a TCP PDU 325. Similarly, when receiving the TCP PDU 325 from the TCP 202A, IP 205A adds an IP header 330 to the TCP PDU 325 in order to form an IP PDU 335. In SNDCP 210A, an SNDCP header 340 is added to the IP PDU 335 in order to form an SNDCP PDU 345, and in LLC 215A, an LLC header 350 is added to the SNDCP PDU 345 in order to form a LLC PDU 355. Similarly, RLC/MAC 220A adds an RLC/MAC header 360 to the LLC PDU 355 in order to form an RLC/MAC PDU 365. Hence, the same user data 300 is included in all the PDUs 315, 325, 335, 345, 355 and 365 of FIG. 3. In order to simplify the description, each PDU of FIG. 3 is shown to correspond to one PDU of each other protocol. However, a protocol data unit of a higher layer protocol may very well be divided into smaller segments by the sending entity of a lower layer protocol, so that a PDU of a higher layer protocol corresponds to several PDUs of a lower layer protocol.

At least four of the protocols shown in FIG. 2 have the capability of error detection and recovery, so that a Protocol Data Unit (PDU) is re-transmitted, should the originally transmitted PDU for some reason appear to not have reached the receiving protocol entity. The capability of re-transmitting data within a protocol is indicated by double-pointed arrows 237 in FIG. 2. Re-transmission of data can be executed between the MS 130 and the BSS 115 by the RLC/MAC protocol 220, between the MS 130 and the SGSN 120 by the LLC protocol 215 and end-to-end by the TCP protocol 200 or the application layer 200.

The re-transmission of data can be initiated by the receiving entity of a protocol, realising that received data is faulty or that expected data is missing, or by the transmitting entity of a protocol not having received an expected acknowledgement of receipt from the receiving entity of said protocol. Since re-transmission can be initiated by different protocols in a system 100, there is a risk that the same user data 300 is successfully transmitted between communicating nodes more than once. To successfully transmit the same user data 300 more than once is disadvantageous in many ways. The (often scarce) transmission resources are used in a non-optimal way. One consequence of this is that fewer data transmission sessions can be served. Furthermore, the time used for completing a data transmission session will be unnecessarily long, since several PDUs will be re-transmitted even after the successful reception of an identical PDU. In some instances, data transmission times may be prolonged to such an extent that a protocol, such as e.g. the TCP protocol 202, decides that the rate of data transmission should be reduced, or even that the data transmission session is not functioning properly and that it therefore should be closed. Such situations will naturally be very frustrating to the user of system 100.

In a system 100 including a mobile radio network 110 operating according to the GRPS standard, used as an example in FIG. 1 and FIG. 2, a timer can be associated with each PDU transferred by a protocol capable of re-transmitting (see 3*GPP TS* 44.064, *Third Generation Partnership Project*, for the LLC protocol, and 3*GPP TS* 44.060, *Third Generation Partnership Project*, for the RLC/MAC protocol). A protocol will not re-transmit a certain PDU until the timer associated with the PDU has expired. The expiry times of the timer used by a certain protocol can then differ from the expiry times of the timer used by other protocols. Such timers can advantageously be set so that the timer associated with the lowest layer protocol expires after the shortest period of time, and a timer associated with a higher layer protocol expires after a longer period of time. In some cases, this will be a successful way of avoiding re-transmission of the same data by more than one protocol at a time. However, for reasons such as, for example, that the quality of the radio interface varies substantially over time, it can be very difficult to estimate the optimal timer expiry times.

In cases where the receiving entities of the different protocols, capable of error detection and recovery, all detect error of transmission, or when the timers of the higher layer protocols expire before the lower layer protocols have finished their re-transmission, several protocols could simultaneously be re-transmitting the same user data 300 towards the same interface. Referring now to FIG. 3 as an example, application data 310, including user data 300, could e.g. be re-transmitted a number of times by RLC/MAC 220, a number of times by LLC 215, and a number of times by TCP 202. If the transmitting entity of RLC/MAC 220 is successful in transmitting an RLC/MAC PDU 365, including application data 310, the transmitting entity of LLC 215 might in the meantime have provided the transmitting entity of RLC/MAC 220 with additional copies of LLC PDU 355, including application data 310, for re-transmission. These additional copies could either have originated from the re-transmission functionality in the application layer 200, from the re-transmission functionality of TCP 202, from the re-transmission functionality in LLC 215 itself, or from a combination of these. The transmitting entity of RLC/MAC 220 will not recognise that the data included in these additional copies of LLC PDU 355 has already been successfully transmitted, and will re-transmit the additional copies of LLC PDU 355. Often, there is an upper limit to how many times a PDU should be re-transmitted by each protocol, but a scenario where a certain PDU is unnecessarily re-transmitted a large number of times can easily be foreseen. The effect of unnecessary re-transmission is, inter alia, that scarce transmission resources are being misused, that the time needed to complete a data transmission session will be unnecessarily long, and that in some instances, the data transmission session will be closed due to long transmission times.

Figure 4A:
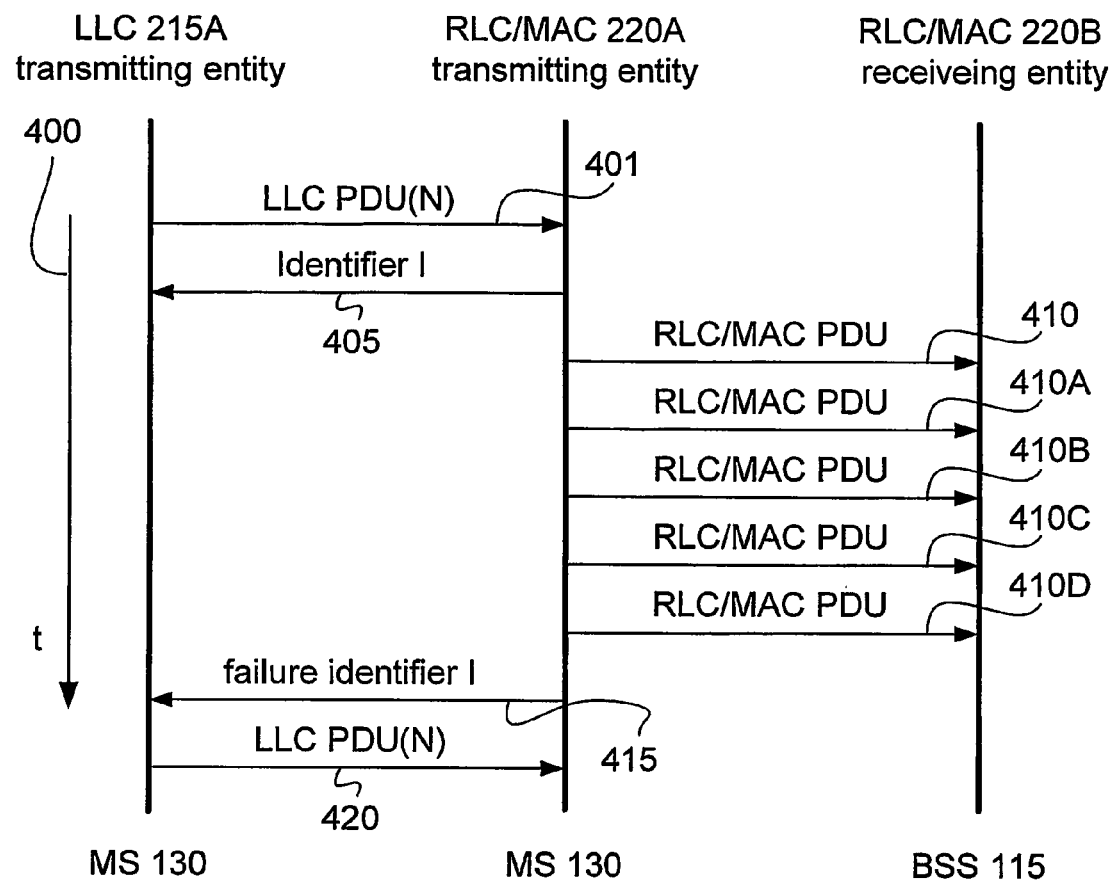
FIG. 4a is an example of an inventive signalling diagram used for signalling between a higher layer protocol and a lower layer protocol, both protocols being capable of re-transmission of data, when both protocols are implemented in the same node.

In order to avoid unnecessary re-transmission of data, different protocols capable of error detection and recovery could be made to co-operate with each other. A higher layer protocol could e.g. be made to wait for a report regarding the result of the (re-)transmission of a certain PDU performed by lower layer protocols, before any decision is taken about whether the higher layer protocol should perform any re-transmission of said PDU. In FIG. 4, an example of such co-operation between different protocols is illustrated in signalling diagrams, where co-operation between the LLC protocol 215 and the RLC/MAC protocol 220 in transmitting data to/from MS 130 is given as an example. The discussion below will be held in terms of these two protocols. However, co-operation between other protocols capable of re-transmission of data could be implemented in a similar manner. It should be noted that FIG. 4a represents a situation where the lower layer and the higher layer re-transmission capable transmission protocol entities are located in the same node, while FIG. 4b illustrates the situation where the lower layer and the higher layer re-transmission capable transmission protocol entities are located in different nodes (cf. FIG. 2).

In FIG. 4a, an example of the provision of protocol data units from LLC 215A in MS 130 to RLC/MAC 220B in BSS 115 is illustrated in a signalling diagram, in which flow of time is indicated by arrow 400. LLC protocol 215A sends a message 401, including an LLC PDU 355, to the RLC/MAC protocol 220A in MS 130, the LLC PDU 355 being formatted according to 3GPP TS 44.064, 3$^{rd}$ Generation Partnership Project, hereby included by reference. The LLC PDU 355 is indexed "N" for identification within the mobile radio network 110. RLC/MAC 220A then confirms the receipt of message 401 in an identification message 405, containing an identifier I, assigned to LLC PDU(N) 355 by RLC/MAC 220A and used for identification of LLC PDU(N) 355 in the communication between LLC 215A and RLC/MAC 220A. Furthermore, RLC/MAC 220A transmits the data included in LLC PDU(N) 355 to the RLC/MAC 220B in BSS 115, see message 410, in an RLC/MAC PDU 365 in message 410. In the example given in FIG. 4a, RLC/MAC 220B in BSS 115 does not acknowledge the receipt of message 410, and RLC/MAC 220A re-transmits the RLC/MAC PDU 365 in messages 410A, 410B, 410C and 410D. When having performed the re-transmission of RLC/MAC PDU 365 a number of times, corresponding to a pre-set maximum number of times for re-transmission (i.e. four times in the example given), RLC/MAC 220A reports, in message 415, to LLC 215A the failure of transmission of the LLC PDU 355 identified by the identifier I. LLC 215A then re-transmits the LLC PDU(N) 355 to RLC/MAC 220A in a message 420, identical to message 401. Alternatively, LLC 215A could issue an alert, indicating that an error has occurred, and/or provide RLC/MAC 220A with a different LLC PDU 355 to be transmitted. As seen in the signalling diagram of FIG. 4a, LLC 215A does not perform any re-transmission of LLC PDU(N) 355 until LLC 215A has received, in message 415, a negative report regarding the transmission of said LLC PDU(N) 355 from RLC/MAC 220A.

In FIG. 4b, an example of a signalling diagram representing the provision of protocol data units from the LLC 215B in SGSN 120 to the RLC/MAC 220A in MS 130, in which the arrow 400 indicates the flow of time. An LLC PDU(N) 355 is transmitted, in message 425, from LLC 215B towards RLC/MAC 220B via BSSGP 230B in SGSN 120. The LLC PDU (N) 355 is indexed "N" for identification purposes within the mobile radio network 110. Message 425 can then be transparently transmitted from BSSGP 230B to BSSGP 230A in BSS 115 via Network 235B in SGSN 120 and Network 235A in BSS 115, and from BSSGP 230B to RLC/MAC 220B in BSS 115, see messages 425i-iv. Upon reception of message 425iv, RLC/MAC 220B confirms the receipt of message 425 in an identification message 430 sent towards the LLC 215B, the identifier message 430 containing an identifier I, used for identification of LLC PDU(N) 355 in the communication between LLC 215 and RLC/MAC 220. The message 430 can then be transparently transmitted from RLC/MAC 220B in BSS 115, to LLC 215B in SGSN 120 via BSSGP 230A and Network 235A in BSS 115, and Network 235B and BSSGP 230B in SGSN 120. The exchange of message 430 can be distinguished from the exchange of message 425 by the use of a parameter Type of Primitive (TOP) included in the message.

When RLC/MAC 220B has received message 425iv, RLC/MAC 220B furthermore transmits, in message 435, the data included in LLC PDU(N) 355 received in message 425iv to RLC/MAC 220A in MS 130, i.e over radio interface 105, in an RLC/MAC PDU 365. In the example given, the transmission of RLC/MAC PDU 365 was successful at the first attempt, and an acknowledgement of the receipt of RLC/MAC PDU 365 is transmitted from RLC/MAC 220A to RLC/MAC 220B (see message 440). Upon reception of the acknowledgement message 440, the RLC/MAC 220B in BSS 115 then reports, to the LLC 215B in SGSN 120, the success of the transmission of the protocol data unit identified by identifier I (see message 445). Message 445 could be transparently transferred to LLC 215B in a similar manner to the transparent transmission of message 430 (see messages 445i-iv). LLC 215B in SGSN 120, which has not sent any further protocol data units towards RLC/MAC 220B since sending message 425, can upon the reception of message 445iv send another protocol data unit to RLC/MAC 220B, e.g. LLC PDU(N+1) 355 (see message 450). The messages 425, 430 and 445 will be further discussed in relation to FIGS. 5a, 5b and 5c.

In FIGS. 4a and 4b, for illustrative purposes only, the messages 410 and 435 have been shown to carry the same amount of user data 300 as the messages 401 and 425, respectively, i.e., a message 401/425 corresponds to one message 410/435. However, in most implementations, the transmitting entity of RLC/MAC 220 would divide an LLC PDU 355 into smaller segments, each segment being transmitted in a separate message 410/435. Thus, each message 401/425 would correspond to several messages 410/435, see e.g. 3GPP TS 44.060, 3rd Generation Partnership Project, hereby incorporated by reference. In order to report a successful transmission of a certain LLC PDU(N) 355 across the radio interface 105, RLC/MAC 220 would have received acknowledgement from the receiving node that all RLC/MAC PDU 365 messages 410/435 corresponding to the LLC PDU(N) 355 carried in message 401 have been successfully received.

In FIG. 4a, the re-transmission of an LLC PDU 355 by LLC 215A was initiated when no response was received by RLC/MAC 220A from RLC/MAC 220B, even after RLC/MAC 220A having re-transmitted message 410 several times. In other situations, the re-transmission of an LLC PDU 355 could be triggered by a negative acknowledgement received by the transmitting entity of RLC/MAC 220 from the receiving entity of RLC/MAC 220—the receiving entity informing the transmitting entity that it has not successfully received the transmitted message 410. When the transmitting entity of RLC/MAC 220 receives a positive acknowledgement from the receiving entity of RLC/MAC 220, obviously, no re-transmission of the LLC PDU 355 by the transmitting entity of LLC 215 is needed. This case is illustrated in FIG. 4b.

The signalling diagrams presented in FIGS. 4a and 4b can be varied in many ways. The message 405/430 of FIG. 4 could e.g. be omitted, and instead, the transmitting entity of LLC 215 could assign an identifier I to LLC PDU(N) 355, said identifier being included in message 401/425. The transmitting entity of RLC/MAC 220 could then send an acknowledgement of reception of message 401/425 to the transmitting entity of LLC 215, or alternatively, the transmitting entity of RLC/MAC 200 could send no confirmation of the reception of message 401/425 to the transmitting entity of LLC 215, but rather, the transmitting entity of LLC 215 could assume that message 401/425 is always safely received by the transmitting entity of RLC/MAC 200.

The index "N", used for identification of an LLC PDU 355 in the network 110, could be used for identification of a certain LLC PDU 355 also in the communication between transmitting entities of LLC 215 and RLC/MAC 220 (referred to in this context as local communication) rather than a separate, local, identifier I. Message 405/430 could then be omitted, or could contain an acknowledgement of the reception of LLC PDU(N) 355. Message 415/445 could then contain information about the success/failure of the transmission of the data contained in LLC PDU 355 indexed "N" over the radio interface 105. An advantage of doing so is that only one identifier is used for the identification of an LLC PDU 355, resulting in a simpler identification system. However, there are advantages also of using a separate identifier for the local communication between the transmitting entities of LLC 215 and RLC/MAC 220. One such advantage is that the identifier I does not, since it is only used locally, need to be transmitted over the radio interface 105, and can hence be a large number. The identifier N on the other hand, since it is used within mobile radio network 110 and hence is transmitted over the radio interface which has a limited bandwidth, has, in a system 100 including a GPRS radio interface, a value of typically 512 bits. A local identifier which does not have to be transmitted over the radio interface 105, could take values larger than the maximum value of N. Thus, the risk of confusing different protocol data units with each other, or alternatively, the risk of having to wait for the confirmation of the successful transmission of a PDU(N) before a different PDU, identified by the same number N, can be transmitted, can be reduced. Furthermore, if the identifier N is used as a local identifier in the communication between the transmitting entities of LLC 215 and RLC/MAC 220, the transmitting entity of RLC/MAC 220 will have to open the LLC header 360 in order to read the value of identifier N. If a separate identifier I is used as the local identifier, then the transmitting entity of RLC/MAC 220 will not need to open the LLC header 360, thus making the transmission process faster. Alternatively, the identifier N could be handled separately in the communication between RLC/MAC 220 and LLC 215, in a manner similar to the handling of identifier I.

In FIGS. 4a and 4b, the transmitting entity of LLC 215 has been shown not to send any further messages 401/425 to the transmitting entity of RLC/MAC 220 after having sent message 401/425, until having received message 415/445. However, the transmitting entity of LLC 215 may very well transmit LLC PDUs 355 other than the LLC PDU(N) 355 included in message 401/425 to the transmitting entity of RLC/MAC 220 before having received message 415/445 from RLC/MAC 220A. A certain LLC PDU 355 will, however, be transferred only once by LLC 215A before LLC 215A has received the result of transmission (message 415/445) regarding said certain LLC PDU 355. The transmission of PDU(N+1) etc. from the transmitting entity of LLC 215 could take place either before or after the transmitting entity of LLC 215 has received message 405/430.

Figure 5A:
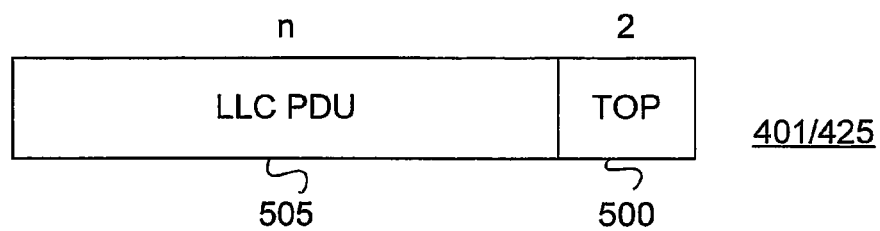
FIG. 5a is an example of a message used for transmitting a Protocol Data Unit (PDU) from a higher layer protocol to a lower layer protocol.

An example of message 401/425 is shown in FIG. 5a, where the message 401/425 contains two different fields. A first field 500 is used to indicate the Type of Primitive (TOP) to be transmitted in the message. In message 401/425, the field 500 could take the value "LL-Data identifier", and e.g. include the value "N". Field 505, shown in FIG. 5a, is used to transmit the LLC PDU 355 to be forwarded by RLC/MAC 220. The digits above the respective fields are used to indicate the number of octets therein, and are given as examples only. Field 505, could for example contain n octets, of which n−3 could be used for LLC PDU 355, one octet could be used to indicate the type of data, and two octets could be used to indicate the length of LLC PDU 355.

Figure 5B:
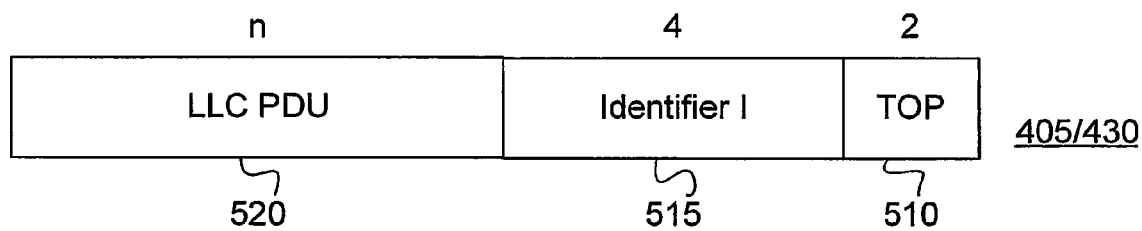
FIG. 5b is an example of a message used for acknowledging the reception of a PDU by a lower layer protocol to a higher layer protocol.

In FIG. 5b, an example of messages 405/430 is shown, used in an embodiment where an identifier I is assigned to each LLC PDU 355 by the transmitting entity of RLC/MAC 220. The message 405/430 given as an example in FIG. 5b contains three fields: type of primitive 510, Identifier I 515 and LLC PDU 520. The field 510 could e.g. take the value "LL-Data Identifier I", used to indicate that the message 405/430 contains an identifier I identifying a certain LLC PDU 355. Field 515 contains the value of identifier I, which e.g. could consist of 4 octets, providing a large range of identifier I values. In order to indicate which LLC PDU 355 is identified by the value of field 515, the LLC PDU 355 could be included in message 405/430 in field 520. Alternatively, only a part of the LLC PDU 355 containing the identifier N could be transmitted in field 520. However, in cases where the transmitting LLC 215 awaits a message 405/430 from the transmitting RLC/MAC 220 before another LLC PDU 355 is transmitted, the field 520 could be omitted. LLC 215 could then associate the identifier in field 515 of a message 405/430 with the last transmitted LLC PDU 355.

Figure 5C:
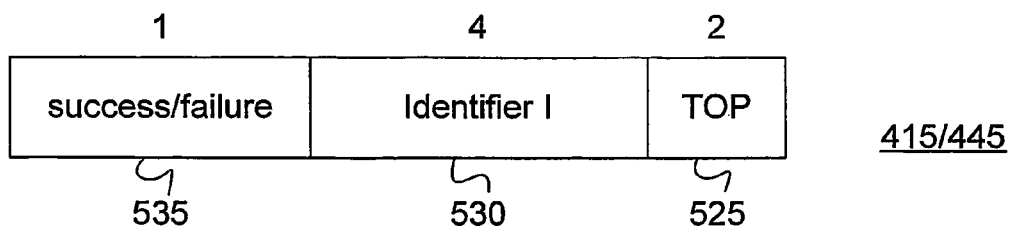
FIG. 5c is an example of a message used for reporting the result of the transmission of a PDU by a lower layer protocol to a higher layer protocol.

In FIG. 5c, an example of the messages 415/445 is given. In field 525, the type of primitive to be transmitted by message 415/445 is indicated, and the value of field 525 could e.g. be "Success/Failure for LLC PDU". In field 530, the value of identifier I, used for identification of the specific LLC PDU 355 about which information is transmitted, is given. Field 535 is used in order to indicate whether the transmission of the LLC PDU 355 identified by identifier I was successful or not. This field could e.g. comprise one octet, where the value 11111111 could represent success and the value 00000000 could represent failure.

In an embodiment where the identifier I is assigned to a certain LLC PDU 355 by the transmitting entity of LLC 215, the contents of messages 401/425, 405/430 and 415/445 should be modified accordingly—the identifier I could e.g. be included as a field in message 401/425. Using the identifier N for identification of a LLC PDU 355 in the communication between LLC 215 and RLC/MAC 220 would also give rise to modifications of messages 401/425, 405/430 and 415/445.

Figure 6:
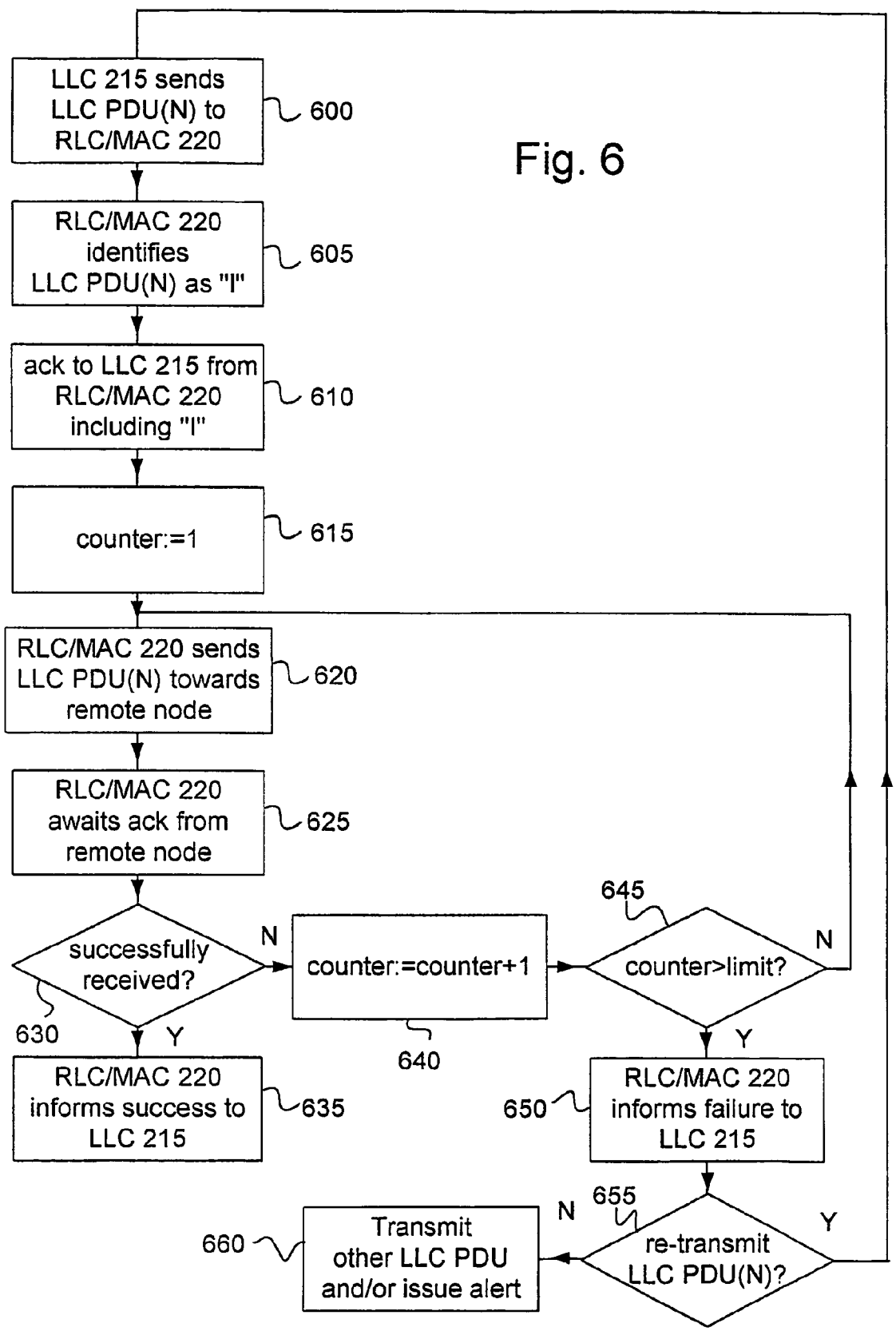
FIG. 6 schematically illustrates one embodiment of the technology in a flow chart.

An embodiment of the technology is illustrated in a flow chart in FIG. 6. In step 600, the transmitting entity of LLC 215 provides the transmitting entity of RLC/MAC 220 with an LLC PDU 355, indexed N, to be transmitted over radio interface 105. In step 605, the transmitting entity of RLC/MAC 220 identifies the LLC PDU(N) 355 with identifier I. The identifier I can either have been assigned to LLC PDU(N) 355 by the transmitting entity of LLC 215 and included in the message containing the LLC PDU(N) 355 sent from the transmitting entity of LLC 215 in step 600, or could be assigned to LLC PDU(N) 355 by the transmitting entity of RLC/MAC 220 upon reception of the LLC PDU(N) 355. The transmitting entity of RLC/MAC 220 then sends an acknowledgement of reception of LLC PDU(N) 355 identified by identifier I to the transmitting entity of LLC 215. A counter in the transmitting entity of RLC/MAC 220 is then set to 1 in step 615. In step 620, the transmitting entity of RLC/MAC 220 transmits the data contained in LLC PDU(N) 355 towards the receiving entity of RLC/MAC 220, located in a node different to the node in which the transmitting entity of RLC/MAC 220 is located. This transmission is often performed in a manner so that the LLC PDU(N) 355 is divided into segments, and several RLC/MAC PDUs 365, all carrying part of LLC PDU(N) 355, are transmitted towards the receiving entity of RLC/MAC 220. However, in order to simplify the description, it is here assumed that LLC PDU(N) 355 is transmitted in one RLC/MAC PDU 365. The transmitting entity of RLC/MAC 220 then awaits an acknowledgement of reception from the receiving entity of RLC/MAC 220 in step 625. If an acknowledgement is received, or if a timer in RLC/MAC 220 related to the awaiting of an acknowledgement expires, then step 630 is entered, in which step it is checked whether the data contained in LLC PDU(N) 355 has been successfully received by the receiving entity of RLC/MAC 220. If the data of LLC PDU(N) 355 has been successfully received, then step 635 is entered, in which step the transmitting entity of RLC/MAC 220 informs the transmitting entity of LLC 215 that the LLC PDU 355 identified by identifier I has been successfully received by the receiving entity of RLC/MAC 220. If the result of the check in step 630 is that the data of LLC PDU(N) 355 has not been successfully received, then step 640 is entered, in which the counter is incremented by one. In step 645, it is then checked whether the value of the counter is larger than a limit indicating a maximum number of times that an RLC/MAC PDU 365 should be re-transmitted. If so, the transmitting entity of RLC/MAC 220 informs the transmitting entity of LLC 215 that the transmission of the LLC PDU 355 identified by identifier I has failed. However, if the counter has a value which is lower or equal to the limit, then step 620 is re-entered. In some embodiments, a timer could be used rather than a counter for determining how many times a certain RLC/MAC PDU 365 should be re-transmitted.

If the procedure described in FIG. 6 has reached step 635, then the transmitting entity of LLC 215 could advantageously transmit another LLC PDU 355 towards the transmitting entity of RLC/MAC 220. If the procedure reaches step 650 on the other hand, where RLC/MAC 220 informs LLC 215 of the failure of the transmission of LLC PDU(N) 355, then step 655 is entered, in which it is decided whether or not to re-transmit the LLC PDU(N) 355. If it is decided that LLC PDU(N) should be re-transmitted, then step 600 is re-entered. If it is decided that LLC PDU(N) should not be re-transmitted, then step 660 is entered. In step 660, another LLC PDU 355 is transmitted, following the flow chart described in FIG. 6, and/or an alert is issued indicating that an error has occurred. The decision made in step 655 can e.g. be based on how many times the transmitting entity of LLC 215 has already re-transmitted LLC PDU(N) 355.

The procedure described by the flow chart in FIG. 6 is equally applicable to situations where the transmitting higher layer protocol and the transmitting lower layer protocol are located in the same node (cf FIG. 4a) and where they are located in different nodes (cf. FIG. 4b). Furthermore, the flow chart can be altered in many ways. For example, the LLC PDU(N) 355 could be identified by the index "N", rather than by the local identifier "I". In this case, as well as in the case when LLC 215 assigns a local identifier "I" to the LLC PDU(N) 355, step 610 could be omitted. Moreover, the transmission of other LLC PDUs could advantageously take place in parallel to the procedure described in FIG. 6, the transmission of LLC PDU(N−1), LLC PDU(N), LLC PDU(N+1) etc. occurring sequentially. The transmission of LLC PDU(N−1), LLC PDU(N+1) etc would then also follow the procedure described in FIG. 6.

The protocol stacks shown in FIG. 2, used for data transmission in data communication systems 100 including a mobile radio system 110 operating according to the GPRS standard, are only given as an example of protocol stacks to which the technology can advantageously be applied. The technology is equally applicable to data communication systems 100 using other protocol stacks in which more than one protocol has the capability of re-transmission of data. An example of such a data communication system 100 is a data communication system 100 including a mobile radio system 110 operating according to the UMTS standard. In FIG. 7, an example of protocol stacks used for the transmission of user data 300 between the nodes MS 130, UTRAN (UMTS Terrestrial Radio Access Network) 115 (corresponding to BSS 115 in FIG. 1), 3G-SGSN 120 and 3G-GGSN 125 of such a data communication system are illustrated, where 3G indicates "3$^{rd}$ generation". The protocols used within a MS 130 operating according to the UMTS standard could e.g. be, as shown in FIG. 7, an application protocol 200A, the TCP protocol 202A, the IP protocol 205A, the Packet Data Convergence Protocol (PDCP) 710A and RLC/MAC 220A. In UTRAN 115, the protocols RLC/MAC 220B and PDCP 710B are used for communication with MS 130, while GPRS Tunnel Protocol-User plane (GTP-U) 715A and User Datagram Protocol/Internet Protocol (UDP/IP) 720A are used for communication with 3G-SGSN 120. In the 3G-SGSN node 120, the protocols UDP/IP 720B and GTP-U 715B are used for communication of data with UTRAN 115, while protocols GTP-U 715C and UDP/IP 720C are used for exchange of data with 3G-GGSN 125. In 3G-GGSN 125, the protocols UDP/IP 720D, GTP-U 715D and IP 205B are used for communication of data with 3G-SGSN 120. In the data transmission system illustrated by protocol stacks in FIG. 7, at least three of the protocols are capable of re-transmitting data: the RLC/MAC protocol 220, TCP protocol 202 and the application protocol 200.

The technology is equally applicable to all data communication which uses more than one protocol capable of re-transmitting data. The technology is especially beneficial to data communication involving interfaces where the quality of the transmission and/or the available bandwidth varies over time. In such cases, it is difficult to pre-set timers associated with re-transmission in an optimal way, since the amount of time needed for successful transmission of a certain amount of data varies with time. Examples of systems providing data communication exhibiting this behaviour are UMTS, GPRS, W-LAN and other cellular systems and land mobile radio networks. In data communication system such as GPRS and UMTS, the bandwidth over radio interface 105 varies over time mainly for two reasons: the quality of the radio transmission varies over time due to variations in geographical and meteorological conditions, and the bandwidth allocated to a certain data call varies over time due to the varying load in the network. Another example of data communication systems to which the technology could advantageously be applied is data communication systems including links which provide different bandwidth in different directions. Although the protocols which has been used as an example to illustrate the technology, LLC and RLC/MAC, are located in adjacent layers, the technology is equally applicable to protocols capable of re-transmission of data that are not located in adjacent layers.

One skilled in the art will appreciate that the present technology is not limited to the embodiments disclosed in the accompanying drawings and the foregoing detailed description, which are presented for purposes of illustration only, but it can be implemented in a number of different ways, and it is defined by the following claims.

The invention claimed is:

1. A method in a data communication system wherein data is transmitted by use of at least two protocols that are capable of re-transmission of data, said protocols being implemented in nodes of said data communication system, the implementation of a protocol implemented in a transmitting node being a transmitting protocol entity and the implementation of a protocol in a receiving node being a receiving protocol entity, one of said at least two protocols capable of re-transmission of data being a higher layer protocol than another of said at least two protocols, said another protocol therefore being a lower layer protocol, the method comprising:

transmitting, from a higher layer transmitting protocol entity, a protocol data unit to a lower layer transmitting protocol entity;

receiving, in said higher layer transmitting protocol entity, a transmission result from said lower layer transmitting protocol entity, said transmission result reporting the result of the transmission of said protocol data unit by said lower layer transmitting protocol entity; and deciding, responsive to said transmission result, whether the higher layer transmitting protocol entity should re-provide said lower layer transmitting protocol entity with said protocol data unit, wherein the higher layer transmitting protocol entity does not re-provide the protocol data unit to the lower layer transmitting protocol entity until after it has received the transmission result.

2. The method of claim 1, wherein encapsulation of data is carried out by means of protocols located in different nodes.

3. The method of claim 1, wherein said protocol data unit is identified by an identifier local to the communication between the higher layer transmitting protocol entity and the lower layer transmitting protocol entity.

4. The method of claim 3, wherein said identifier is assigned to said protocol data unit by said higher layer transmitting protocol entity.

5. The method of claim 3, wherein said higher layer transmitting protocol entity receives an acknowledgement of reception of said protocol data unit from said lower layer transmitting protocol entity after having provided said lower layer transmitting protocol entity with said protocol data unit, said protocol data unit being identified by said identifier in said acknowledgement of reception.

6. The method of claim 1, wherein said transmission result is transmitted to said higher layer transmitting protocol entity in a message which is transparently relayed by any intermediate protocol entities that are logically positioned between the higher layer transmitting protocol entity and the lower layer transmitting protocol entity.

7. The method of claim 1, wherein said protocol data unit is identified by an identifier assigned by the lower layer transmitting protocol entity.

8. The method of claim 1, wherein said higher layer transmitting protocol entity and said lower layer transmitting protocol entities are located within different nodes.

9. The method of claim 1, wherein said data communication system comprises a radio interface.

10. The method of claim 9, wherein said radio interface is a radio interface in a mobile radio communication system.

11. The method of claim 10, wherein said mobile radio communication system is a mobile radio communication system operating according to the General Packet Radio System standard; and the higher layer transmitting protocol entity is a Logical Link Control protocol and the lower layer transmitting protocol entity is a Radio Link Control/Media Access Control protocol.

12. A non-transitory computer readable medium storing computer software that includes computer code portions to be run on a computer that implements a higher layer transmitting protocol entity of a data communications system and computer code portions to be run on a computer that implements a lower layer transmitting protocol entity of the data communications system, wherein the higher layer transmitting protocol entity and the lower layer transmitting protocol entity are both capable of re-transmitting data, and wherein the computer software causes the higher and lower layer transmitting protocol entities to perform a method comprising:

transmitting, from the higher layer transmitting protocol entity, a protocol data unit to the lower layer transmitting protocol entity; receiving, in said higher layer transmitting protocol entity, a transmission result communicated from said lower layer transmitting protocol entity, said transmission result reporting the result of the transmission of said protocol data unit by said lower layer transmitting protocol entity; and deciding, based on the transmission result, whether the higher layer transmitting protocol entity should re-provide said lower layer transmitting protocol entity with said protocol data unit, wherein the higher layer transmitting protocol entity does not re-provide the lower layer transmitting protocol entity with the protocol data unit until after it receives the transmission result communicated from the lower layer transmitting protocol entity.

13. The non-transitory computer readable medium of claim 12, wherein the computer software also causes the higher layer transmitting protocol entity to allocate an identifier to each protocol data unit transmitted to the lower layer transmitting protocol entity.

14. The non-transitory computer readable medium of claim 12, wherein the computer software also causes the lower layer transmitting protocol entity to allocate an identifier to each protocol data unit received from the higher layer transmitting protocol entity.

15. The non-transitory computer readable medium of claim 12, wherein the computer software causes the higher layer transmitting protocol entity to communicate using a Logical Link Control protocol.

16. The non-transitory computer readable medium of claim 12, wherein the computer software causes the lower layer transmitting protocol entity to communicate using a Radio Link Control/Media Access Control protocol.

17. The non-transitory computer readable medium of claim 12, wherein the computer software also causes the lower layer transmitting protocol entity to send a receipt acknowledgment to the higher layer transmitting protocol entity upon receipt of the protocol data unit.

18. The non-transitory computer readable medium of claim 17, wherein the computer software causes the lower layer transmitting protocol entity to include an identifier assigned to the protocol data unit in the receipt acknowledgment sent to the higher layer transmitting protocol entity.

19. The non-transitory computer readable medium of claim 18, wherein the identifier is assigned to the data unit by the higher layer transmitting protocol entity.

20. The non-transitory computer readable medium of claim 18, wherein the identifier is assigned to the data unit by the lower layer transmitting protocol entity.

* * * * *